United States Patent
Asahina et al.

(10) Patent No.: US 10,823,501 B2
(45) Date of Patent: Nov. 3, 2020

(54) DRYING METHOD AND DRYING DEVICE OF INSTANT NOODLES

(71) Applicant: NISSIN FOODS HOLDINGS CO., LTD., Osaka (JP)

(72) Inventors: Takeshi Asahina, Tokyo (JP); Takaaki Hibi, Tokyo (JP); Noriyuki Machida, Tokyo (JP); Mitsuru Tanaka, Tokyo (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 581 days.

(21) Appl. No.: 14/378,766

(22) PCT Filed: Mar. 18, 2013

(86) PCT No.: PCT/JP2013/001823
§ 371 (c)(1),
(2) Date: Aug. 14, 2014

(87) PCT Pub. No.: WO2013/145626
PCT Pub. Date: Oct. 3, 2013

(65) Prior Publication Data
US 2015/0296845 A1  Oct. 22, 2015

(30) Foreign Application Priority Data
Mar. 30, 2012 (JP) ................... 2012-081792

(51) Int. Cl.
*F26B 3/08* (2006.01)
*A23L 7/113* (2016.01)
(Continued)

(52) U.S. Cl.
CPC ............... *F26B 3/082* (2013.01); *A23L 3/40* (2013.01); *A23L 7/109* (2016.08); *A23L 7/113* (2016.08);
(Continued)

(58) Field of Classification Search
CPC .......... F26B 21/022; F26B 3/08; F26B 3/082; F26B 9/06; F26B 9/066; F26B 2210/06;
(Continued)

(56) References Cited

U.S. PATENT DOCUMENTS

| 4,922,811 A * | 5/1990 | Stumpf | A21B 3/133 |
| | | | 206/818 |
| 2002/0022073 A1* | 2/2002 | Soehnlen | A23G 9/00 |
| | | | 426/393 |

(Continued)

FOREIGN PATENT DOCUMENTS

| CN | 101437434 A | 5/2009 |
| CN | 101820774 A | 9/2010 |

(Continued)

OTHER PUBLICATIONS

Chinese Office Action in related Chinese Patent application No. 201380009429.0, dated May 21, 2015 (with partial English-language translation).

*Primary Examiner* — Jessica Yuen
(74) *Attorney, Agent, or Firm* — Greenblum & Bernstein, P.L.C.

(57) ABSTRACT

An object of the present invention is to provide a method for drying non-fried instant noodles for obtaining non-fried noodles that are easily loosened without sticking of noodle strings and excellent in restorability. The present invention includes, as a step of drying non-fried instant noodles, a step of putting gelatinized noodle strings into a drying retainer, and blowing a high-speed air flow from above the retainer toward a noodle mass of the noodle strings to perform drying. In the drying step, the retainer employed has a shape such that a transition portion from a bottom surface to a side surface (side wall portion) is formed to be a curved surface with a radius of curvature of 5 to 15 mm, and preferably the (Continued)

high-speed air flow is blown at a wind speed of 50 m/s or higher in terms of the speed to which the noodle strings are exposed.

4 Claims, 1 Drawing Sheet

(51) Int. Cl.
  *A23L 7/109* (2016.01)
  *F26B 9/06* (2006.01)
  *A23L 3/40* (2006.01)
  *F26B 21/02* (2006.01)

(52) U.S. Cl.
  CPC ............ *F26B 9/066* (2013.01); *F26B 21/022* (2013.01); *F26B 2210/06* (2013.01); *F26B 2210/08* (2013.01)

(58) Field of Classification Search
  CPC ........ F26B 2210/08; A23L 1/16; A23L 7/109; A23L 7/113; A23L 3/40
  See application file for complete search history.

(56) References Cited

U.S. PATENT DOCUMENTS

| | | | |
|---|---|---|---|
| 2004/0191437 A1* | 9/2004 | Asayama | B31F 1/0077 428/34.2 |
| 2006/0165859 A1 | 7/2006 | Desai et al. | |
| 2007/0295631 A1* | 12/2007 | Lin | B65D 21/0222 206/508 |
| 2011/0229613 A1 | 9/2011 | Takizawa et al. | |
| 2013/0036919 A1 | 2/2013 | Desai et al. | |

FOREIGN PATENT DOCUMENTS

| | | | |
|---|---|---|---|
| JP | 01191633 A | * | 8/1989 |
| JP | H 03-251148 A | | 11/1991 |
| JP | H 07-053508 Y | | 12/1995 |
| JP | 2515849 Y | | 8/1996 |
| JP | H 09-051773 A | | 2/1997 |
| JP | H-0947224 | | 2/1997 |
| JP | 2666224 B | | 6/1997 |
| JP | H-09210554 | | 8/1997 |
| JP | 2003-153661 A | | 5/2003 |
| JP | 2005-160401 A | | 6/2005 |

\* cited by examiner

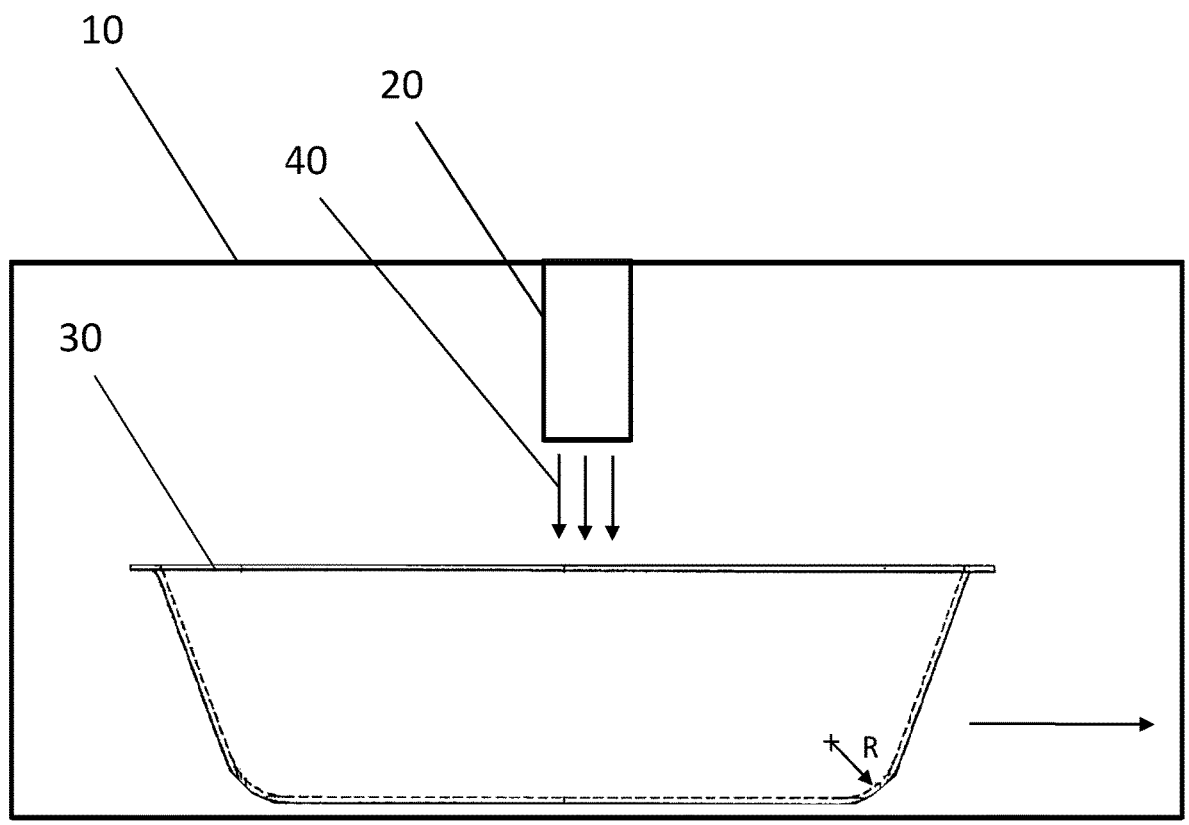

DRYING METHOD AND DRYING DEVICE OF INSTANT NOODLES

TECHNICAL FIELD

The present invention relates to a method and a device for drying instant noodles for obtaining instant noodles that are easily loosened.

BACKGROUND ART

Instant noodles can be divided into two types: fried noodles prepared by frying and drying noodles; and non-fried noodles prepared by drying noodles without frying. Non-fried noodles have noodle strings giving a denser feeling than that of fried noodles, and provide a texture closer to that of fresh noodles, but sticking of the noodle strings is liable to occur at the time of drying so that the noodle strings may become hard to loosen. There are several methods for drying non-fried noodles. The mainstream is a hot-air drying method in which noodles are dried for about 30 to 60 minutes by being exposed to the hot air having a wind speed of around 5 m/s or less and a temperature of around 70 to 100° C. Additional examples of the method include a low-temperature drying method in which noodles are dried for a long time at a low temperature, and a high-temperature and high-speed flash drying method in which noodle strings are exposed to a high-temperature and high-speed air flow at around 100° C. to 200° C. as disclosed in Patent Document 1.

Typically, in the case of fried noodles, the noodles acquire a fixed shape while floating in frying oil with moisture evaporation, and therefore a mass of the noodles is relatively bulky and the sticking of the noodle strings is relatively less likely to occur. In the case of non-fried noodles, however, since gelatinized noodles are put into a retainer and dried in the air, the noodle strings are compressed downward by the force of gravity so that the noodle strings are easily in contact with each other, and particularly in the lower surface of the noodle mass, the noodle strings collect in a high concentration, resulting in easy sticking thereof. When the sticking of noodle strings occurs, the noodle strings are hard to loosen at the time of cooking or eating, and hot water is less likely to penetrate in the stuck noodle strings at the time of cooking. The part in which hot water does not sufficiently penetrate fails to be rehydrated, and thus is deteriorated in texture.

As a technique for preventing the sticking of noodle strings, for example, there is known a method in which noodle strings are loosened by blowing air onto a noodle mass in a retainer as disclosed in Patent Documents 2 and 3. However, the loosening devices disclosed in Patent Documents 2 and 3 are intended to improve the loosening of noodle strings in such a manner that the noodle strings put in the retainer are separated so as not to form a mountain-like mass in the retainer, failing to provide a sufficient loosening effect. Particularly, in these devices, the noodle strings are pushed toward the bottom of the retainer, especially toward a corner portion (peripheral portion) of the bottom of the retainer, so that sticking of noodle strings in such a position may occur.

On the other hand, for the purpose of reducing the sticking of noodle strings and improving the loosening thereof, there is an option of preparing a bulky-shaped noodle mass to reduce the contact area among the noodle strings as much as possible. Such a technique for preventing the sticking of noodle strings by preparing a bulky noodle mass is disclosed in Patent Documents 4 and 5.

The invention in Patent Document 4 defines the density of a mass of non-fried noodles that are easily loosened with good rehydration (restorability). The document discloses, as a method for preparing the noodle mass with a low noodle mass density, a method in which wind having a low temperature (30° C.) is blown upward from below the noodle mass at a wind speed of 5 m/s.

Patent Document 5 describes that instant noodles which are easily loosened with good restorability are provided by adjusting the water content of steamed noodles in the retainer to a predetermined level and then blowing the compressed air from below the retainer to prepare a bulky noodle mass. Patent Document 6 includes no direct description about sticking of noodle strings, but describes a technique of blowing the dry air from below a retainer having multiple air holes in its bottom surface to generate an air flow along the inner wall and bottom surface of the retainer so as to give buoyancy to noodle strings, and thereby preventing the noodle mass from adhering on the retainer.

All the techniques in Patent Documents 4, 5 and 6 are, however, those of blowing the air upward from below a retainer, in which the air blown from below first collides against the bottom surface of the retainer so that the force of the air is weakened, and accordingly the drying efficiency is reduced and the effect of improving the loosening of noodle strings may not be sufficiently attained.

PRIOR ART DOCUMENTS

Patent Documents

Patent Document 1: JP-A-09-051773
Patent Document 2: JP-Y-07-053508
Patent Document 3: JP-U-2515849
Patent Document 4: JP-A-2003-153661
Patent Document 5: JP-A-03-251148
Patent Document 6: JP-A-2005-160401

SUMMARY OF THE INVENTION

Problems to be Solved by the Invention

A primary object of the present invention is to provide non-fried noodles that are easily loosened without sticking of noodle strings and excellent in restorability, and another object is to dry the noodle strings as uniformly as possible.

Means for Solving the Problems

As a result of investigations by the present inventors, the following has been found. In a method for drying non-fried noodles, when gelatinized noodle strings are put into a conventional and general retainer (having a bottom surface intersecting with a side wall surface with an apex to form an internal corner portion) and then dried, there is a problem that the noodle strings are pushed toward the bottom of the retainer, particularly toward a transition portion (corner portion) from the bottom surface to the side surface (side wall) of the retainer, and thus the sticking of noodle strings occurs; whereas when a high-speed air flow is injected downward from above the retainer, and the retainer has a shape such that the transition portion is formed to be a curved surface, and further the radius of curvature of the portion is set within a specific range, the above-mentioned problem can be solved.

Specifically, by forming the retainer with a specific radius of curvature, the noodle strings are prevented from being pushed toward the bottom or corner portion of the retainer, and further the air flow blown from above at a high speed turns at the curved surface so that the noodle strings may exhibit a state of adequately leaping in the retainer, and are dried in such a state to obtain a mass of non-fried noodles which is bulky and easily loosened without sticking of noodle strings.

That is, the present invention is a method for drying instant noodles including a step of putting gelatinized noodle strings into a retainer for drying instant noodles, the retainer having a shape such that a transition portion from a bottom surface to a side surface is formed to be a curved surface with a radius of curvature of 5 to 15 mm, and blowing a high-speed air flow from above the retainer to perform the drying.

As described above, by using the retainer having a shape such that a transition portion from a bottom surface to a side surface is formed to be a curved surface with a radius of curvature of 5 to 15 mm, the noodle strings are prevented from being pushed toward the corner portion of the retainer, and further it is thought that the air flow blown from above at a high speed turns at the curved surface and is bounced off the noodle strings, thereby generating a turbulent air flow in the retainer. This allows the noodle mass in the retainer to exhibit a behavior of being lifted and agitated, and the noodle strings can be dried while being loosened. Accordingly, there is provided a noodle mass which is easily loosened and uniformly dried. This is a difference between the present method and the methods disclosed in Patent Documents 4 to 6 in which the air is blown from below the retainer to generate a laminar air flow for drying.

On the other hand, if the radius of curvature of the transition portion (corner portion) from a bottom surface to a side surface of the retainer is 5 mm or less, the noodles are pushed toward the corner portion so that the sticking of noodle strings is liable to occur in the peripheral part of the noodle mass. Whereas, if the radius of curvature exceeds 15 mm, the noodle string density around the center of the bottom surface of the noodle mass is increased, so that the sticking of noodle strings is liable to occur around the center.

In order to achieve the effect as described above, the high-speed air flow blown from above the retainer preferably has a wind speed of 50 m/s or higher in terms of the speed to which the noodle mass in the retainer is exposed.

In the present invention, the high-speed air flow is a hot air flow having a temperature of 100° C. to 150° C. in terms of the temperature to which the noodle strings are exposed. This makes it possible to dry the surface of the noodle strings in a short time to quickly eliminate the stickiness of the noodle strings generated by gelatinization, providing the noodles having a cooked feeling and a good texture.

In the present invention, the effects of preventing the sticking of noodle strings and improving the loosening thereof are achieved to some extent at the point of time when the stickiness of the surface of the noodle strings is eliminated. Besides, at the point of time when the water content of the noodle mass is reduced to about 30% or less by further drying, the bulk of the noodle mass is mostly determined. Therefore, it is possible that the drying method as described above is employed until either of the above points of time, after which the wind speed or the temperature may be decreased, or a different drying method may be employed, examples thereof including a common hot-air drying method and a drying method in which a high-temperature air flow is blown not only from above but also from below the noodle mass.

The device used in the present invention is a device which is capable of performing the drying method as described above, particularly, a device for drying instant noodles in which a retainer is conveyed inside the device and a high-speed air flow is blown from above toward the retainer being conveyed so that gelatinized noodle strings in the retainer are dried, wherein the retainer has a shape such that a transition portion from a bottom surface to a side surface is formed to be a curved surface with a radius of curvature of 5 mm to 15 mm.

In the case of the retainer for drying a noodle mass for one meal portion, the retainer is preferably a substantially cup-shaped or substantially deep dish-shaped retainer having a volume of about 400 to 700 cc and a bottom area of about 40 to 150 $cm^2$. Additionally, in the device of the present invention, the air flow blown from above preferably has a wind speed of 50 m/s or higher in terms of the speed to which the noodle strings are exposed.

Effects of the Invention

According to the method and the device for drying instant noodles of the present invention, there are provided non-fried noodles that are improved in loosening of noodle strings and excellent in restorability.

BRIEF DESCRIPTION OF DRAWING

FIG. 1 is a side view depicting an exemplary retainer in accordance with aspects of the present disclosure.

MODE FOR CARRYING OUT THE INVENTION

Hereinafter, the present invention will be described in detail according to production steps.

In the present invention, from kneading of ingredients to gelatinization of noodle strings, a usual method for producing non-fried noodles may be applied.

Specifically, a mixture of wheat flour and optionally starch, buckwheat flour and other cereal flours is used as a main ingredient powder, thereto are optionally added auxiliary ingredients such as salt, brine, polyphosphate, egg white, gluten, an emulsifier, and fat and oil, and the ingredients are sufficiently kneaded together with kneading water. The auxiliary ingredients may be added to the main ingredient in the form of a powder, or in the form of a mixture with the kneading water. After sufficient kneading to produce a noodle dough, the noodle dough is shaped into a dough sheet by using a composite dough sheet machine or the like, and the dough sheet is passed through rolling rollers several times to be rolled out into a thin sheet with a final dough sheet thickness, and then cut out by a cutter blade roll into noodle strings. Incidentally, in mechanical noodle production, generally the noodle dough is cut out into noodle strings as described above, although it may be extruded by an extruder into noodle strings as is the case with spaghetti.

The raw noodle strings produced as above are gelatinized by steaming or boiling, or by combining both. The gelatinized noodle strings are optionally subjected to spraying with or immersion in a liquid seasoning containing salt or a flavoring and salt, the resultant noodle strings are cut into one meal portion, and the one meal portion is then put into a retainer and dried.

As shown in FIG. 1, the retainer used in the present invention is a substantially cup-shaped or substantially deep dish-shaped retainer for drying instant noodles, with the bottom surface being substantially horizontal and the side surface (side wall) rising from the bottom surface. The transition portion rising from the bottom surface to the side surface is formed to be a curved surface without any angular corner, and the curved surface has a radius of curvature R of 5 to 15 mm. The side surface of the retainer preferably has an even and flat face without small hole. The bottom surface of the retainer may be formed to have no hole, that is, no air permeability, but is preferably formed to have multiple small holes giving air permeability.

In the present invention, the high-speed air flow is blown from above the retainer toward the noodle strings in the retainer, and when the transition portion from the bottom surface to the side surface of the retainer is formed to be a curved surface with a radius of curvature of 5 to 15 mm, the noodle strings are less likely to be pushed toward the corner portion (transition portion) even by the high-speed air flow, and the noodle strings are lifted or exhibit a state of adequately leaping due to the air flow which has turned at the curved surface of the retainer, thus a noodle mass which is easily loosened without sticking of noodle strings is obtained. If the radius of curvature is larger than 15 mm, the noodle strings are likely to be collected at the center of the retainer, and then the sticking of noodle strings around the center is liable to occur.

When the transition portion from the bottom surface to the side surface is formed to be a curved surface as described above, the boundary between the bottom surface and the side surface may be indefinite. As used herein, the bottom surface of the retainer refers to an area defined by the tangent line at the round transition portion making an angle of 45° or less with the bottom surface (horizontal surface) of the retainer.

If the bottom surface of the retainer has no air permeability, the drying efficiency is decreased. Thus, it is preferred that the bottom surface has one or more small holes for air permeability. In this case, each small hole formed in the bottom surface of the retainer has such a size that a noodle string in the retainer is prevented from falling through the hole, and desirably has a diameter of about 0.5 to 6 mm. Preferably the holes are formed to be substantially uniformly distributed at equal intervals in the bottom surface.

Preferably, the ratio of the total area of the multiple small holes formed in the bottom surface to the area of the bottom surface of the retainer is within the range of 10 to 30% (both inclusive) (the ratio of the total area of the small holes to the area of the bottom surface is referred to as "aperture ratio"). When the aperture ratio is set within the range of 10 to 30% (both inclusive) so as to give a smaller area giving air permeability, the air flow blown from above the retainer does not leak at once from the bottom surface of the retainer, and the air flow streaming along the curved surface formed between the bottom surface and the side surface allows the noodle strings to exhibit a behavior of leaping-like or of being lifted and agitated in the retainer. This makes the noodle mass more bulky so that the sticking of noodle strings is reduced. In the case of an ordinary hot-air drying machine for instant noodles, the aperture ratio of the bottom surface of the retainer is about 50 to 80%.

If the retainer has a corner portion inside thereof, the noodle strings are easily collected at the portion. In order to avoid this, in the present invention, most preferably the side surface (side wall) of the retainer has a round shape without any corner portion in top view, and also a rectangular shape with round corner portions may be possible. Further, if the retainer has a mortar-shaped side surface (side wall) with a wide opening, the noodle strings in the retainer easily jump out from the opening due to the strong air flow. Therefore, it is preferred that the side surface of the retainer is perpendicular to the bottom surface, or has a taper angle of up to about 20°. For the size of the retainer for one meal portion, as a specific example, the retainer may have a volume of about 400 to 700 cc and a bottom area of about 40 to 150 $cm^2$, while the retainer may have a greater depth or volume so as to keep the noodles from easily jumping out.

Into the retainer as described above, the gelatinized noodles are put, and the high-speed air flow is then injected from above the retainer downward to the noodle strings in the retainer. The high-speed air flow is preferably blown toward the retainer vertically downward at a wind speed of 50 m/s or higher, especially preferably 60 to 80 m/s as measured at around the upper surface of the noodle mass placed in the retainer. The air flow at such a speed may be blown either continuously or intermittently.

As shown in FIG. 1, in the present invention, the device 10 may be of any type as far as the device 10 is capable of providing a strong air flow having a high speed as described above, and one example thereof is a system in which the air flow sent from a powerful fan is narrowed at an injection part to give an increased wind speed for injection. For example, the device 10 may have a tubular injection nozzle or a slit-like injection nozzle as an injection part 20, and the nozzle is preferably disposed above the retainer 30 and allowed to vigorously inject the hot air 40. When the strong air flow is blown in a spot injection manner as described above, the noodle strings are more surely agitated, and likely to exhibit their leaping-like behavior.

Specifically, in a high-temperature flash drying device used for, for example, puffing drying a snack food, or firing or roasting various processed foods as described in JP-A-09-47224 and JP-A-2003-90680, a retainer which is conveyed under a nozzle therein desirably has the shape of the retainer for noodles as mentioned above. Incidentally, in the device of the present invention, the high-speed air flow is required to be blown from above toward the retainer having the shape as mentioned above, while there may also be used a device, for example, in which nozzles are disposed not only above but also below the retainer as disclosed in JP-A-09-210554 as far as the above drying method according to the present invention can be applied in the device.

The present invention is intended to prevent the sticking of noodle strings, and if just for drying the surface of the noodle strings, and if the air flow is blown for a long time, the temperature of the blown air flow may be a normal temperature. However, when the air flow has a higher temperature, the noodle strings are quickly dried and give a preferable texture with a cooked feeling. In order to obtain such effects, a particularly preferable temperature is about 100° C. to 150° C.

Further, when the surface of the noodle strings is dried, it becomes non-sticky, that is, the sticking of noodle strings is substantially reduced, and thus the loosening of noodle strings is substantially improved at this stage. Therefore, the above drying method may be performed for a short time until the surface of the noodle strings is dried, and then the noodle strings may be anew dried by a different drying method.

In order to obtain a bulky noodle mass which is further easily loosened and uniformly restored, the noodle strings may be dried until the shape of the noodle mass is nearly fixed, or approximately until the water content of the noodle strings is reduced to about 30%; thus, the noodle strings may be dried with the high-speed air flow as described above until the water content of the noodle strings is reduced to about 30%, after which the noodle strings may be dried by a different drying method. Specifically, conditions including the temperature and the wind speed may be changed, or alternatively a typical hot-air drying machine used for drying non-fried noodles, or other drying methods may be employed for the finish drying. Further, at the time of achieving the effect of loosening improvement, the retainer may be replaced with a retainer having a general shape.

The instant noodles (non-fried noodles) dried in this manner are put into a cup container made of a synthetic resin or paper for producing cupped noodles, or packaged in a packaging bag for producing bagged noodles. Such instant noodles are easily loosened without sticking of noodle strings, and give a good texture at the time of rehydration, cooking or eating.

EXAMPLES

Experiment 1: Test for Curvature in Bottom Surface of Retainer

As a main ingredient, 150 g of starch was added to 850 g of wheat flour. Then, 20 g of salt, 3 g of brine, and 1 g of polyphosphate were dissolved in 400 ml of water and the solution was added to the main ingredient. The ingredients were sufficiently kneaded by a mixer, and formed into a dough sheet with a thickness of 12 mm by a composite dough sheet machine. The dough sheet was passed through continuous rolling rollers to give a final dough sheet thickness of 1.8 mm. The dough sheet was cut out by a cutter blade roll with a square cutter (No. 16) into strings, thereby obtaining raw noodle strings.

The cut out raw noodle strings were conveyed on a net conveyor, steamed with saturated steam at about 100° C. and at a steam flow rate of 240 kg/h for 2 minutes, and subsequently boiled with boiling water for 10 seconds. The resulting gelatinized noodle strings were immersed in a liquid seasoning containing 5% of salt and a small amount of a flavoring dissolved therein for several seconds, after which the noodle strings were cut into one meal portion (180 g), and the one meal portion was put into a retainer.

Example 1

A retainer having the following specifications was used: a volume of about 450 cc, an opening diameter of the retainer (diameter of the upper side of the retainer) of 137 mm, a height of 40 mm, and a taper angle (the angle between the plane perpendicular to the bottom surface and the side surface spreading outward) of 20°, wherein small holes formed in the bottom surface of the retainer had a diameter of 4.0 mm and were substantially uniformly distributed in the entire bottom surface, the bottom surface has a flat face with a ratio of the total area of the small holes to the area of the bottom surface of the retainer of 58% (an aperture ratio of 58%). In Comparative Example 1 was used the above-defined retainer further having a corner portion between the bottom surface and the side surface (side wall) (that is, having the bottom surface intersecting with the side wall surface with an apex to form an internal corner portion), which is a general retainer used for hot-air dried noodles. On the other hand, in Example 1 was used the same retainer as above except that the transition portion from the bottom surface to the side surface was formed to be a curved surface with a radius of curvature R of 10 mm. The noodle strings put in these retainers were dried under the following conditions, respectively.

Using a drying machine having such a structure that a high-temperature and high-speed air flow is blown at a high speed from a nozzle disposed above in the vertical direction, in which about 240 narrow tubular nozzles are disposed per 1 $m^2$ of the ceiling in a drying chamber, and the high-temperature and high-speed air flow is injected from the nozzles toward the retainer being conveyed below the nozzles, the retainer was allowed to travel horizontally at a traveling speed of about 2.5 m/s in the drying chamber.

The drying temperature was 140° C. as measured by a sensor placed at an outlet of the nozzle. The wind speed was adjusted to a maximum speed of 70 m/s as measured at around the surface of the noodle strings by a pitot tube disposed near the upper surface of the noodle mass, and the air flow was blown for 72 seconds. Subsequently, for finish drying, the noodle mass was dried in an ordinary hot-air drying machine at an inside temperature of 90° C. and a wind speed of 4.0 m/s for 60 minutes. The finally obtained noodle mass had a weight of approximately 90 g.

To the instant noodle mass produced in this manner was poured 400 ml of boiling water, and the noodle mass was left for 4 minutes before eating. As a result, the noodle mass prepared by using the retainer with the transition portion from the bottom surface to the side surface formed to be a curved surface with a radius of curvature R of 10 mm in Example 1 according to the present invention was reduced in density of noodle strings at the bottom surface of the noodle mass and improved in the loosening of noodle strings at the time of eating, as compared to that prepared by using the conventional retainer having the internal corner portion formed between the bottom surface and the side surface in Comparative Example 1.

Examples 2 and 3

For investigation of the relationship between the radius of curvature of the transition portion from the bottom surface to the side surface of the retainer and the loosening of noodle strings, a comparative experiment was carried out using retainers having the same volume and general shape as those described above, in which the number of the small halls in the bottom surface of the retainers was reduced to give a ratio of the total area of the small holes to the area of the bottom surface (aperture ratio) of 20% so that the noodle strings could more easily exhibit the leaping behavior in the retainer. In the retainers with the reduced aperture ratio as described above, the radius of curvature R of the transition portion from the bottom surface to the side surface was set to 0 (Comparative Example 2), 5 mm (Example 2), 10 mm (Example 3), and 20 mm (Comparative Example 3), respectively. The retainers used in this experiment were almost the same as that in Example 1 as described above except that the retainers had different radiuses of curvature of the transition portion from a bottom surface to a side surface and had an aperture ratio in the bottom surface of 20%. The drying device, the drying method and conditions were the same as in Example 1. The results are shown in Table 1.

TABLE 1

| Radius of Curvature R (mm) | Loosening of noodle strings at the time of eating | Evaluation for shape | Comments |
|---|---|---|---|
| 0 | 2 | 1 | Higher density in a peripheral part of the bottom surface of the noodle mass, with an edge formed therein. |
| 5 | 4 | 4 | Improved in the loosening of noodle strings, in spite of an edge formed in the bottom surface of the noodle mass. |
| 10 | 5 | 5 | Most preferable state. |
| 20 | 2 | 2 | Higher density in a central part of the bottom of the noodle mass, with sticking of noodle strings. |

The evaluations on a 5-point scale were made by five panelists. The panelists ate the noodles after pouring 400 ml of boiling water onto the noodle mass and leaving it for 4 minutes. The evaluation for the loosening of noodle strings at the time of eating was made based on the criteria as follows; point 5: the noodle state capable of being loosened very easily, point 4: the noodle state capable of being loosened easily with chopsticks, point 3: the noodle state capable of being loosened with chopsticks, point 2: the noodle state of being partially hard to loosen with chopsticks, and point 1: the noodle state of being hard to loosen with chopsticks due to heavy sticking of the noodle strings. The evaluation for shape was made by confirmation before the pour of boiling water, based on the criteria as follows; point 5: the preferable state of being bulky and entirely uniform, point 3: the state of being not especially high in density of noodle strings in a corner part or the like of the noodle mass, with no great problem in restorability expected, and point 1: the state of being very high in density of noodle strings in the lower part of the noodle mass, with poor rehydration expected.

Experiment 2: Test for Wind Speed

Next, the wind speed of the air flow blown to noodles for obtaining a noodle mass that is easily loosened was changed to 30 m/s to 70 m/s for carrying out Experiment 2, with use of the retainer having a radius of curvature R of 10 mm which was used for Example 3 in Experiment 1. Other conditions including the device used, the temperature, and the drying time were all the same as in Experiment 1. The results are shown in Table 2. In this experiment, the evaluation for shape was made by actually measuring the height of a noodle mass according to the following method.

Method for measuring height of noodle mass: measurement was made for three positions at 30 mm from the center of the noodle mass, as well as for six positions at 15 mm from the center of the noodle mass, and the average of the measurements was calculated as the height of the noodle mass.

The results from the experiment indicated that the optimal wind speed varies according to the noodle weight. In the case of the wind speed of 60 m/s, when the experiment was carried out using one meal portion of the noodle mass having a slightly lighter weight (weight of the noodles put into the retainer) of 170 g, there was provided a noodle mass that is very easily loosened (point 5).

TABLE 2

| Wind speed (m/s) | Evaluation for shape (mm) Height of noodle mass (average) | Loosening of noodle strings at the time of eating | Comments |
|---|---|---|---|
| 30 | 22.5 | 2 | Poor loosening of noodle strings with sticking. |
| 40 | 23.1 | 2 | Poor loosening of noodle strings with sticking. |
| 50 | 24.4 | 3 | Partial sticking of noodle strings is observed, but sticking is much improved compared to the case of 40 m/s. |
| 60 | 24.9 | 4 | Partial sticking of noodle strings is observed, but sticking is further improved compared to the case of 50 m/s. |
| 70 | 27.0 | 5 | Excellent loosening of noodle strings without sticking. |

Experiment 3: Test for Temperature

The wind speed of the air flow was set to 70 m/s and the temperature of the blown air flow was changed to 60° C. to 160° C. for carrying out Experiment 3, with use of the retainer having a radius of curvature R of 10 mm which was used for Example 3 in Experiment 1. Other conditions including the device used, the wind speed, and the drying time were all the same as in Example 3. The results are shown in Table 3.

TABLE 3

| Temperature (° C.) | Evaluation for shape (mm) Height of noodle mass (average) | Loosening of noodle strings at the time of eating | Comments |
|---|---|---|---|
| 60 | 27.0 | 4 | Rawish taste, somewhat lacking in cooked feeling |
| 80 | 27.6 | 4 | Rawish taste, somewhat lacking in cooked feeling |
| 100 | 27.4 | 5 | Cooked feeling in texture |
| 120 | 27.5 | 5 | Cooked feeling in texture |
| 140 | 27.2 | 5 | Cooked feeling in texture |
| 160 | 27.1 | 4 | Good texture, with slight sticking of the noodle strings |

Example 4

Drying Method Only by High-Temperature and High-Speed Air Flow

In accordance with the same formulation and method as those for Example 3 in Experiment 1 as described above, raw noodle strings were prepared and then similarly gelatinized so that gelatinized noodle strings were prepared. The gelatinized noodle strings were immersed in a liquid seasoning containing 5% of salt and a small amount of a flavoring dissolved therein for several seconds, and the noodle strings were cut. About 180 g of the cut noodle strings were put into a retainer similar to that in Example 3, having a radius of curvature R of 10 mm, an aperture ratio of 20%, and a volume of about 450 cc. Then, in the same drying device as in Example 3, the high-temperature and high-speed air flow was injected from the nozzle above the retainer and applied to the noodle mass in the retainer at a wind speed of up to 70 m/s as measured by a pitot tube disposed near the upper surface of the noodle mass. It should be noted that in Example 4 drying was performed by not utilizing the combination of the drying with the high-temperature and high-speed air flow and the general drying with the hot-air as in Example 3, but only by the drying with the high-temperature and high-speed air flow. Specifically, drying was performed at 155° C. for initial 60 seconds, then at 130° C. for subsequent 60 seconds, and at 110° C. for further 13 minutes, as measured by a thermometer disposed near the outlet of the nozzle. Also by the method in Example 4, there were provided noodles that are increased in bulkiness, much more easily loosened and improved in texture as compared to those in Comparative Example 2.

Example 5

In accordance with the same formulation and method as those for Example 3 in Experiment 1 as described above, raw noodle strings were prepared and then similarly gelatinized so that gelatinized noodle strings were prepared. The gelatinized noodle strings were immersed in a liquid seasoning containing 5% of salt and a small amount of a flavoring dissolved therein for several seconds, and the noodle strings were cut. About 180 g of the cut noodle strings were put into a retainer similar to that in Example 3 in outer shape, having a volume of about 450 cc, an aperture ratio of 20%, and a radius of curvature R of the transition portion from the bottom surface to the side surface of 10 mm, but having no small hole in the bottom surface, that is, an aperture ratio of 0%. Then, in the same drying device as in Example 3, the high-temperature and high-speed air flow of 140° C. was injected from the nozzle above the retainer and blown to the noodle mass in the retainer for 72 seconds at a wind speed of up to 50 m/s as measured by a pitot tube disposed near the upper surface of the noodle mass.

Since it takes a long time to perform drying with the retainer having no small hole in the bottom surface, that is, a retainer having an aperture ratio of 0%, the noodle mass was transferred to a retainer having an aperture ratio of 20% and a radius of curvature R of 10 mm as in Example 3 immediately after the 72-second treatment. Subsequently, the noodle mass was dried in an ordinary hot-air drying machine at an inside temperature of 90° C. and a wind speed of 4.0 m/s for 60 minutes in the same manner as the finish drying in Example 3. The noodle mass after dried had a weight of approximately 90 g. Also by the method in Example 5, there were provided noodles that are more easily loosened and improved in texture as compared to those in Comparative Example 2.

The invention claimed is:

1. A method for drying instant noodles, comprising:
   putting gelatinized noodle strings into a retainer for drying instant noodles, the retainer having a shape such that a transition portion from a bottom surface to a side surface is formed to be a curved surface with a radius of curvature of 5 mm to 15 mm, and
   blowing a high-speed air flow from above the retainer,
   wherein an injection nozzle is disposed above the retainer, and the injection nozzle blows the high-speed air flow,
   the drying is performed while the noodle strings are lifted and agitated to be loosened in the retainer by the high-speed air flow, and
   the retainer has a volume of about 400 to 700 cc, the bottom surface of the retainer has an area of about 40 to 150 cm$^2$, and the bottom surface of the retainer is formed to have no hole, or a ratio of a total area of small holes formed in the bottom surface of the retainer to an area of the bottom surface of the retainer is within a range of 10 to 30%.

2. The method for drying instant noodles according to claim 1, wherein the high-speed air flow has a wind speed of 50 m/s or higher in terms of the speed to which a noodle mass of the noodle strings in the retainer is exposed.

3. The method for drying instant noodles according to claim 1, wherein the high-speed air flow is a hot air flow having a high temperature of 100° C. to 150° C. in terms of the temperature to which the noodle strings are exposed.

4. The method for drying instant noodles according to claim 1, further comprising drying the noodle strings by a different drying method after the blowing the high-speed air flow, wherein said different drying method differs from said blowing the high speed airflow by temperature and wind speed, so that both temperature and wind speed in the different drying are different from a temperature and wind speed of the high-speed air flow.

* * * * *